(12) United States Patent
El Batt et al.

(10) Patent No.: US 7,054,936 B2
(45) Date of Patent: May 30, 2006

(54) PRIORITY-BASED DYNAMIC RESOURCE ALLOCATION METHOD AND APPARATUS FOR SUPPLY-DEMAND SYSTEMS

(75) Inventors: Tamer El Batt, Woodland Hills, CA (US); Bong Ryu, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 763 days.

(21) Appl. No.: 10/097,543

(22) Filed: Mar. 12, 2002

(65) Prior Publication Data

US 2003/0018803 A1    Jan. 23, 2003

Related U.S. Application Data

(60) Provisional application No. 60/275,171, filed on Mar. 12, 2001, provisional application No. 60/339,797, filed on Oct. 30, 2001.

(51) Int. Cl.
*G06F 15/173*    (2006.01)

(52) U.S. Cl. ............ 709/226; 709/236; 709/208; 709/209; 370/348

(58) Field of Classification Search ........ 709/225–226, 709/208–209, 236; 370/347–348; 455/509, 455/512–513
See application file for complete search history.

(56) References Cited

U.S. PATENT DOCUMENTS 6,172,971 B1 *  1/2001  Kim .................. 370/348
6,614,778 B1 *  9/2003  Hwang ................ 370/348
6,741,614 B1 *  5/2004  Porter et al. ............ 370/508

FOREIGN PATENT DOCUMENTS

| WO | WO 9914897 A | 3/1999 |
| WO | WO 9914898 A | 3/1999 |
| WO | WO 9914898 A1 * | 3/1999 |
| WO | WO 00 59260 A | 10/2000 |

OTHER PUBLICATIONS

Dunlap, J., et al., "Performance of statistically multiplexed access mechanism for a TDMA radio interface", IEEE Personal Communications. IEEE Communications Society, US, vol. 2, No. 3, Jun. 1, 1995, pp. 56-64, XP000506582.*

(Continued)

*Primary Examiner*—Glenton Burgess
*Assistant Examiner*—LaShanya Nash
(74) *Attorney, Agent, or Firm*—Tope-McKay & Associates

(57) ABSTRACT

A computer network uplinking system, method, and computer program product are presented for allocation of network resources. A controller tier includes a controller node 100 having a processor 102, a memory 104, and a communication interface 106. Also, an uplinking tier includes uplinking nodes 108, with a processor 110, a memory 112, and a communication interface 114. The nodes 108 communicate the controller node 100 in frames. Current and next frames are represented as K and K+1. The nodes 108 request reservations from the controller node 100 based on the data each needs to transmit. The controller node 100 generates a control signal based on the reservation requests to assign slots of a information subframe of the next frame K+1 to the nodes 108 based on the priority allocated to the node 108 and the data each needs to transmit. The nodes 108 then transmit in their assigned slots.

57 Claims, 6 Drawing Sheets

OTHER PUBLICATIONS

J. Sanchez et al., "A Survey of MAC Protocols Proposed for Wireless ATM," IEEE Network, pp. 52-62, Nov. 1997.

I. Akyildz et al., "Medium Access Control Protocols for Multimedia Traffic in Wireless Networks." IEEE Network, pp. 39-47, Jul. 1999.

D. Goodman et al., "Packet Reservation Multiple Access for Local Wireless Communications," IEEE Transactions on Communications, vol. 37, No. 8, pp. 885-890, Aug. 1989.

T. Yum et al., "Analysis of a Dynamic Reservation Protocol for Interactive Data Services on TDMA-Based Wireless Networks," IEEE Transactions on Communications, vol. 47, No. 12, Dec. 1999.

M. Hadjitheodosiau and E. Geranitis, "Dynamic Bandwidth Allocation For Multimedia Traffic in TDMA Broadband Satellite Networks," AIAA International Communications Satellite Systems Conference, Yokohama, Japan, Feb. 1998.

F. Khan and D. Zeghlache, "Priority-based multiple access (PBMA) for statistical multiplexing of multiple services in wireless PCS," in Proc. ICUPC, Cambridge, MA. pp. 17-21, 1996.

Dunlop, J., et al., "Performance of a statistically multiplexed access mechanism for a TDMA radio interface" IEEE Personal Communications, IEEE Communications Society, US, vol. 2, No. 3, Jun. 1, 1995, pp. 56-64, XP000506582.

Haartsen J., "Bluetooth—the Universal radio interface for ad hoc, wireless connectivity" On— Ericsson Review, Ericsson, Stockholm, SE, No. 3, 1998, pp. 110-117, XP000783249.

A.K. Parekh and R.G. Gallager, "A Generalized Processor Sharing Approach to Flow Control in Integrated Services Networks: The Single-Node Case," IEEE/ACM Transactions on Networking, vol. 1, No. 3, Jun. 1993, pp. 344-357.

A. Demers, S. Keshav, and S. Shenker, "Analysis and Simulation of a Fair Queueing Algorithm," Internetworking: Research and Experience, vol. 1, 1990, pp. 3-26.

J-F. Frigon, V.C.M, Leung, and H. Chan Bun Chan, "Dynamic Reservation TDMA Protocol for Wireless ATM Networks," IEEE Journal on Selected Areas in Communications, vol. 19, No. 2, Feb. 2001, pp. 370-383.

* cited by examiner

PRIORITY-BASED DYNAMIC RESOURCE ALLOCATION METHOD AND APPARATUS FOR SUPPLY-DEMAND SYSTEMS

PRIORITY CLAIM

This application claims the benefit of priority to the following provisional applications; No. 60/275,171, titled Priority-Based Dynamic Resource Allocation Method and Apparatus for Supply-Demand Systems filed with the United States Patent and Trademark Office on Mar. 12, 2001; and Ser. No. 60/339,797 titled Priority-Based Dynamic Resource Allocation Method and Apparatus for Supply-Demand Systems filed with the United States Patent and Trademark Office on Oct. 30, 2001.

GOVERNMENT RIGHTS

At least a portion of the subject matter herein is related to government contract number PO: 331439K from the government agency ACN. The United States government may have certain rights in this invention under this contract.

TECHNICAL FIELD

The present invention relates generally to computer networks, and more specifically to a system for maximizing wireless computer network efficiency.

BACKGROUND OF THE INVENTION

Wireless networks generally have a fixed amount of bandwidth available for information transmission. Schemes have been developed to allocate this bandwidth in the most efficient manner. Various bandwidth allocation schemes have been introduced in the cellular and satellite networks literature. For example, packet reservation multiple access (PRMA) has been introduced to integrate voice and data applications over the shared wireless medium. A major limitation of PRMA is its limited priority support for real-time traffic over non real-time traffic.

Time division multiple access (TDMA) is a well-known digital transmission technology that allows a number of users to access a single radio-frequency (RF) channel without interference by allocating unique time slots to each user. The time division multiple access (TDMA) based protocols proposed for wireless ATM networks were variations of Slotted Aloha and PRMA that do not provide any support for variations related to the priority of a particular class of traffic and are not optimal in any sense.

The wireless industry began to explore converting the existing analog network to digital as a means of improving capacity back in the late 1980s. In 1989, the Cellular Telecommunications Industry Association (CTIA) chose TDMA over Motorola's frequency division multiple access (FDMA) (today known as narrowband analog mobile-phone service [NAMPS]) narrowband standard as the technology of choice for existing 800 MHz cellular markets and for emerging 1.9-GHz markets. With the growing technology competition applied by Qualcomm in favor of code division multiple access (CDMA) and the realities of the European global system for mobile communications (GSM) standard, the CTIA decided to let carriers make their own technology selection.

The two major (competing) systems that split the RF are TDMA and CDMA. CDMA is a spread-spectrum technology that allows multiple frequencies to be used simultaneously. CDMA codes every digital packet it sends with a unique key. A CDMA receiver responds only to that key and can pick out and demodulate the associated signal.

Because of its adoption by the European standard GSM, the Japanese Digital Cellular (JDC), and North American Digital Cellular (NADC), TDMA and its variants are currently the technology of choice throughout the world. However, over the last few years, a debate has convulsed the wireless community over the respective merits of TDMA and CDMA.

The TDMA system is designed for use in a range of environments and situations, from hand-held portable use in a downtown office to a mobile user traveling at high speed on the freeway. The system also supports a variety of services for the end user, such as voice, data, fax, short message services, and broadcast messages. TDMA offers a flexible air interface, providing high performance with respect to capacity, coverage, and unlimited support of mobility and capability to handle different types of user needs. There exists a need for different services where TDMA doesn't differentiate. The next level of sophistication is differentiation.

In the article, "Dynamic Bandwidth Allocation for Multimedia Traffic in TDMA Broadband Satellite Networks", by M. Hadjitheodosiou and E. Gerantiotis, in AIAA International Communications Satellite Systems Conference, Yokohama, Japan, February 1998, there was a proposal for a dynamic bandwidth allocation protocol for multimedia traffic with different levels of priority. The drawbacks of this protocol were twofold: the first drawback results from a lack of support for multiple classes of services with different levels of priority. The second drawback relates to the long-run optimization of the weighted sum of the distortion rate of video traffic, packet dropping probability of voice traffic, and the buffer lengths of data traffic. The authors asserted that solving the long-run optimization problem was found to be computationally intensive and hence, real-time implementation would prove to be infeasible in real-world situations.

In light of these shortcomings in the art, a need exists for a priority based resource reservation system which reserves resources based on a priority associated with requests for resource reservations. In the more specific case of a computer network, a need exists to provide a novel priority-based slot allocation strategy that gives an equal chance for all traffic streams to attempt reservations, and then leaves it for the allocation algorithm to make the optimal decision. It is further desirable to determine the optimal allocation on a frame-by-frame basis and to provide support for multiple classes of priority as well as providing a closed form solution.

REFERENCES

[1] M. Hadjitheodosiou and E. Geraniotis, "Dynamic Bandwidth Allocation For Multimedia Traffic in TDMA Broadband Satellite Networks", *AIAA International Communications Satellite Systems Conference*, Yokohama, Japan, February 1998.

[2] J. Sanchez et al., "A Survey of MAC Protocols Proposed for Wireless ATM", *IEEE Network*, pp. 52–62, November 1997.

[3] I. Akyildiz et al., "Medium Access Control Protocols for Multimedia Traffic in Wireless Networks", *IEEE Network*, pp. 39–47, July 1999.

[4] D. Goodman et al., "Packet Reservation Multiple Access for Local Wireless Communications", *IEEE Transactions on Communications*, vol 37, no. 8, pp. 885–890, August 1989.

[5] F. Khan and D. Zeghlache, "Priority-based multiple access (PBMA) for statistical multiplexing of multiple services in wireless PCS", in *Proc. ICUPC*, Cambridge, Mass., pp. 17–21, 1996.

[6] T. Yum et al., "Analysis of a Dynamic Reservation Protocol for Interactive Data Services on TDMA-Based Wireless Networks", *IEEE Transactions on Communications*, vol. 47, no. 12, December 1999.

[7] B. Gottfried and J. Weisman, "Introduction to Optimization Theory", Prentice-Hall, New Jersey, 1973.

[8] A. Demers, S. Keshav, and S. Shenkar, "Analysis and Simulation of a Fair Queuing Algorithm", Internet. Res. And Exper., vol. 1, 1990.

[9] A. Parekh and R. Gallager, "A Generalized Processor Sharing Approach to Flow Control in Integrated Services Networks: The Single-Node Case", *IEEE/ACM Transactions on Networking*, vol 1, no. 3, June 1993.

SUMMARY OF THE PRESENT INVENTION

The present invention relates generally to computer networks and more specifically to maximizing wireless computer network efficiency, and can be tailored to a variety of other applications such as use for allocating scarce service resources to a plurality of requesters.

In a general embodiment, the present invention is a computer network uplinking system comprising a controller tier having a controller node having a processor, a memory communicatively coupled with the processor, and a communication interface communicatively coupled with the processor. Also, an uplinking tier is provided including a plurality uplinking nodes, with each one of the plurality of uplinking nodes having a processor, a memory communicatively coupled with the processor, and a communication interface communicatively coupled with the processor. The communication interface of each one of the plurality of uplinking nodes communicates with the communication interface of the controller node by transmitting and receiving data in a series of frames. Each frame includes a reservation subframe with a plurality of reservation slots. Each frame further includes an information subframe including a plurality of slots. A current frame is represented as frame K and a next frame represented as a frame K+1. Each uplinking node further includes at least one data application operating within its memory and processor, with the data application operative to generate data having a particular priority, and wherein the processor generates a reservation request based on the data generated by the data application. The uplinking node transmits the request to the controller node via the reservation subframe of the current frame K through its communication interface. The reservation subframe of the frame K includes the aggregate of the reservation requests of the plurality of uplinking nodes.

The controller node is operative to receive the reservation subframe including the reservation requests of the plurality of uplinking nodes in the frame K. When the reservation subframe has been received, the controller node utilizes the priority of each data application as well as information about the data generated by the data application in order to allocate the slots of the information subframe of the next frame K+1. To facilitate the allocation of the slots, the controller node sends a control signal to each of the uplinking nodes indicating the slots of the information subframe of the next frame K+1 in which the respective uplinking node is authorized to transmit.

Each one of the plurality of uplinking nodes is operative receive the control signal from the controller node, and to transmit data from the data application in the slots of the information subframe of the next frame K+1 in which the uplinking node is authorized to transmit.

Preferably, the uplinking nodes communicate with the controller node by means of a wireless channel and the uplinking nodes are terrestrial vehicles and wherein the controller node is a non-terrestrial vehicle. However, in some embodiments, both the uplinking nodes and the controller node may be either terrestrial or non-terrestrial vehicles.

In addition to network resources, other types of resources may be allocated via computer by means of the present invention, such as banking services. In another embodiment, the controller node serves as a mechanism for allocating limited service resources to customers and the uplinking nodes serve as means for requesting service resource allocations from the controller node based on customer requests where the customer requests have priorities.

In another embodiment, the controller node may serve as an uplinking node to higher-level controller node and the uplinking nodes may serve as controller nodes for lower-level uplinking nodes, whereby a multi-tier computer uplinking system is formed as a tree-type structure.

The data applications used at each uplinking node may transmit data in packets, and the slots of the information subframe may be allocated by the controller node via solving the following optimization problem:

$$B_{ij}^{\min}(K) = \sum_i \sum_j [L_{ij}(K+1) - B_{ij}(K)]P_{ij},$$

such that $$\sum_i \sum_j B_{ij}(K) = N,$$

where
  $B_{ij}(K)$=number of slots per information subframe allocated to data application j from node i in frame K;
  $P_{ij}$=priority of data application j from node i;
  N=number of slots per information subframe; and
  $L_{ij}(K+1)$=a predicted buffer length of data application j from node i in frame K+1, and is given by the following relationship, $L_{ij}(K+1) = L_{ij}(K) - B_{ij}(K-1) + A_{ij}(K)$ where, $A_{ij}(K)$=an estimation of the number of packet arrivals from data application j in node i in frame K.

An optimal solution to the optimization problem that may be used in conjunction with the present invention is given by the following equation:

$$B_{ij}(K) = \frac{L_{ij}(K+1)}{\left(1 + \frac{\mu}{P_{ij}}\right)},$$

where $\mu$ is a constant determined from the constraint $$\sum_i \sum_j B_{ij}(K) = N.$$

Further, the present invention may be exercised specifically as a controller node for use in a network uplinking system for allocating resources among a plurality of requesters, typically in the form of uplinking nodes.

The present invention may also be exercised specifically as an uplinking node for use in a computer networking system for requesting resources from a controller node and for transmitting data according to the allocations set forth by the controller node.

In another embodiment, the present invention comprises a method for facilitating computer network uplinking comprising several steps. The first (and optional) step is providing a controller tier including a controller node having a processor, a memory communicatively coupled with the processor, and a communication interface communicatively coupled with the processor. The second (and optional) step is providing an uplinking tier including a plurality uplinking nodes, with each one of the plurality of uplinking nodes having a processor, a memory communicatively coupled with the processor, and a communication interface communicatively coupled with the processor.

In a transmitting step, data is transmitted between the controller node and the uplinking nodes in a series of frames, with each frame including a reservation subframe including a plurality of reservation slots, and an information subframe including a plurality of slots, and with a current frame represented as frame K and a next frame represented as a frame K+1. In an operating step, a data application is operated in the memory and processor of each uplinking node to generate data having a particular priority. Further, in a reservation request generating step, a reservation request is generated in the processor of each uplinking node on the data generated by the data application. Once the reservation request has been generated, it a transmitting step is performed wherein the request from the uplinking node is transmitted to the controller node via the reservation subframe of the current frame K through the communication interface of the uplinking node, with the reservation subframe of the frame K including the aggregate of the reservation requests of the plurality of uplinking nodes.

In a receiving step, the reservation subframe is received at the controller node, including the reservation requests of the plurality of uplinking nodes in the frame K. In an allocating step, the controller node allocates slots of the information subframe of the next frame K+1 based on the priority of each data application as well as information about the data generated by the data application.

A control signal is transmitted to each of the uplinking nodes from the controller node indicating the slots of the information subframe of the next frame K+1 in which the respective uplinking node is authorized to transmit. The control signal is received at each one of the plurality of uplinking nodes, and the uplinking node transmits data from the data application in the slots of the information subframe of the next frame K+1 in which it is authorized to transmit.

Preferably, all of the transmitting and receiving steps in the method are performed by means of a wireless channel.

Additionally, the controller node may be provided as a means for allocating limited service resources to customers and the uplinking nodes may be provided as a means for requesting service resource allocations from the controller node based on customer requests where the customer requests have priorities.

In another embodiment of the method, the controller node may be provided to optionally serve as an uplinking node to higher-level controller node and wherein the uplinking nodes may be provided to optionally serve as controller nodes for lower-level uplinking nodes, whereby a multi-tier computer uplinking system is formed as a tree-type structure.

In a further refinement, in the transmitting step, each data application transmits data in packets, and wherein in the allocating step, the slots of the information subframe are allocated by the controller node via solving the following optimization problem:

$$B_{ij}^{\min}(K) = \sum_i \sum_j [L_{ij}(K+1) - B_{ij}(K)]P_{ij},$$

such that $$\sum_i \sum_j B_{ij}(K) = N,$$

where
  $B_{ij}(K)$=number of slots per information subframe allocated to data application j from node i in frame K;
  $P_{ij}$=priority of data application j from node i;
  N=number of slots per information subframe; and
  $L_{ij}(K+1)$=a predicted buffer length of data application j from node i in frame K+1, and is given by the following relationship, $L_{ij}(K+1) = L_{ij}(K) - B_{ij}(K-1) + A_{ij}(K)$, where $A_{ij}(K)$=an estimation of the number of packet arrivals from data application j in node i in frame K.

In a still further refinement of the method, in the allocating step, the solution to the optimization problem is given by the following equation:

$$B_{ij}(K) = \frac{L_{ij}(K+1)}{\left(1 + \frac{\mu}{P_{ij}}\right)},$$

where $\mu$ is a constant determined from the constraint $$\sum_i \sum_j B_{ij}(K) = N.$$

In a still further embodiment of the present invention, a computer program product may be provided facilitating uplinking in a computer network comprising a controller tier including a controller node having a processor, a memory communicatively coupled with the processor, and a communication interface communicatively coupled with the processor and an uplinking tier including a plurality of uplinking nodes, with each one of the plurality of uplinking nodes having a processor, a memory communicatively coupled with the processor, and a communication interface, communicatively coupled with the processor. In this embodiment, the computer program product is operative for facilitating the steps of:

a. transmitting data between the controller node and the uplinking nodes in a series of frames, with each frame including a reservation subframe including a plurality of reservation slots, and an information subframe including a plurality of slots, and with a current frame represented as frame K and a next frame represented as a frame K+1;

b. operating a data application in the memory and processor of each uplinking node to generate data having a particular priority;

c. generating a reservation request in the processor of each uplinking node on the data generated by the data application;

d. transmitting the request from the uplinking node to the controller node via the reservation subframe of the current frame K through the communication interface of the uplinking node, with the reservation subframe of the frame K including the aggregate of the reservation requests of the plurality of uplinking nodes;

e. receiving, at the controller node, the reservation subframe including the reservation requests of the plurality of uplinking nodes in the frame K;

f. allocating slots of the information subframe of the next frame K+1 based on the priority of each data application as well as information about the data generated by the data application;

g. transmitting a control signal to each of the uplinking nodes from the controller node indicating the slots of the information subframe of the next frame K+1 in which the respective uplinking node is authorized to transmit;

h. receiving the control signal from the controller node, at each one of the plurality of uplinking nodes; and i. transmitting data from the data application in the slots of the information subframe of the next frame K+1 in which the uplinking node is authorized to transmit.

Preferably, the computer program product is operative to facilitate steps wherein the transmitting and receiving steps are all performed by means of a wireless channel.

Additionally, the computer program product may be tailored such that in the transmitting step, each data application transmits data in packets, and wherein in the allocating step, the slots of the information subframe are allocated by the controller node via solving the following optimization problem:

$$B_{ij}^{min}(K) = \sum_i \sum_j [L_{ij}(K+1) - B_{ij}(K)] P_{ij},$$

such that $$\sum_i \sum_j B_{ij}(K) = N,$$

where $B_{ij}(K)$=number of slots per information subframe allocated to data application j from node i in frame K;

$P_{ij}$=priority of data applications from node i;

N=number of slots per information subframe; and $L_{ij}(K+1)$=a predicted buffer length of data application j from node i in frame K+1, and is given by the following relationship, $$L_{ij}(K+1) = L_{ij}(K) - B_{ij}(K-1) + A_{ij}(K),$$

where $A_{ij}(K)$=an estimation of the number of packet arrivals from data application j in node i in frame K.

In a still further refinement, the computer program product may be operative for facilitating uplinking wherein in the allocating step, the solution to the optimization problem is given by the following equation:

$$B_{ij}(K) = \frac{L_{ij}(K+1)}{\left(1 + \frac{\mu}{P_{ij}}\right)},$$

where $\mu$ is a constant determined from the constraint $$\sum_i \sum_j B_{ij}(K) = N.$$

BRIEF DESCRIPTION OF DRAWINGS

The objects, features and advantages of the present invention will be apparent from the following detailed description of the preferred embodiments of the invention in conjunction with reference to the drawings, which are briefly described below.

DETAILED DESCRIPTION

Figure 1:
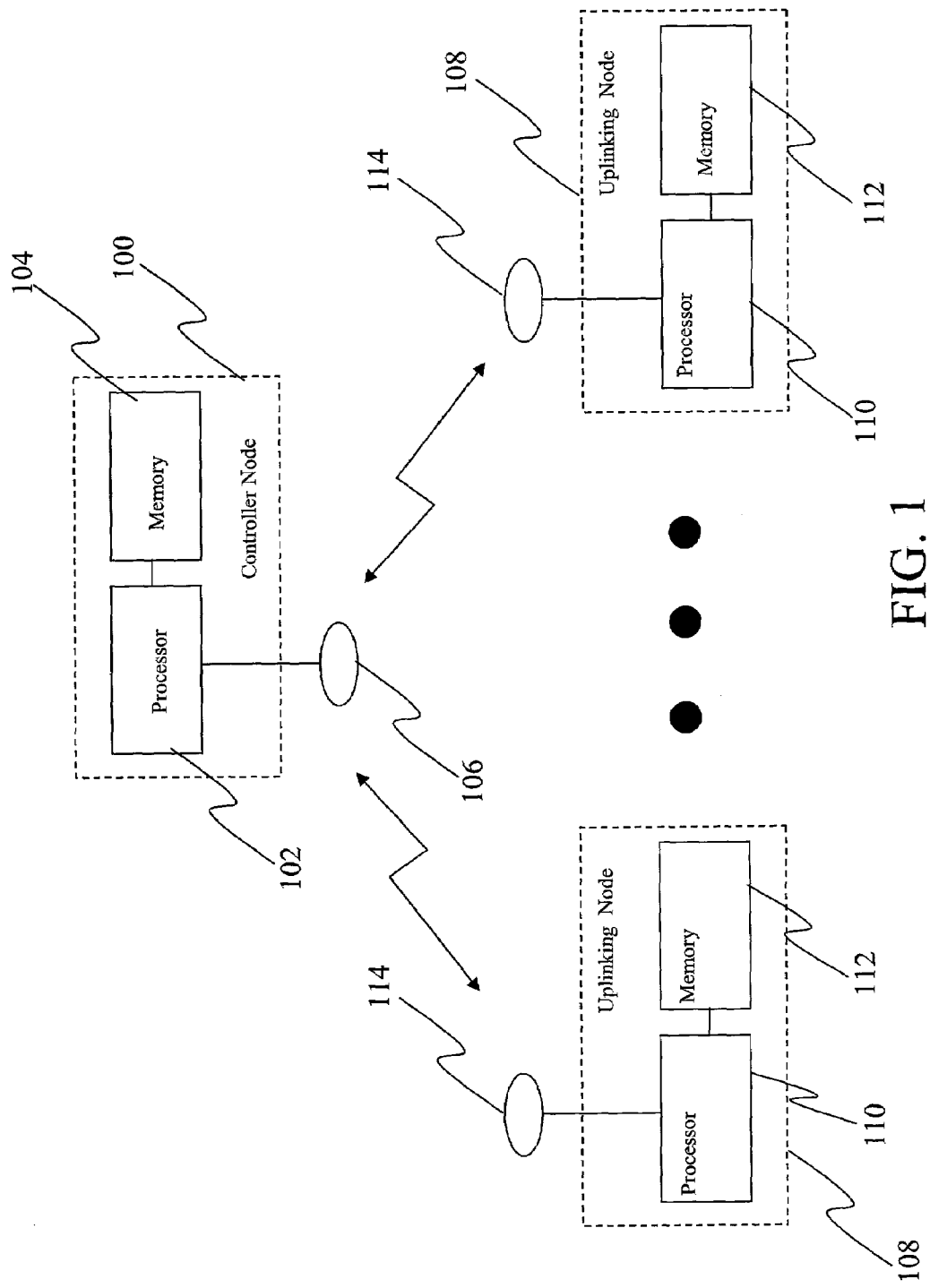
FIG. 1 is a block diagram representation of communication between uplinking nodes and a controller node.

The present invention relates generally to computer networks and more specifically to maximizing wireless computer network efficiency, and can be tailored to a variety of other applications such as its use for allocating scarce service resources to a plurality of requesters. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of embodiments. Thus, the present invention is not intended to be limited to the embodiments presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

In order to provide a working frame of reference, first a glossary of terms used in the description and claims is given as a central resource for the reader. Next, a brief introduction is provided in the form of a narrative description of the present invention to give a conceptual understanding prior to developing the specific details.

Glossary

Before describing the specific details of the present invention, it is useful to provide a centralized location in which various terms used herein and in the claims are defined. The glossary provided is intended to provide the reader with a feel for the intended meaning of the terms, but is not intended to convey the entire scope of each term. Rather, the glossary is intended to supplement the rest of the specification in conveying the proper meaning for the terms used.

Contention-based: This refers to a system in which multiple users share a common transmission band in a way that can lead to conflicts. Whenever two nodes try to communicate using the same slot, there will be collisions and both will have to try transmitting again.

Contention-free: Refers to a system in which multiple users share a common transmission band in a way that traffic is allocated without having collisions between various traffic streams. In this case, by utilizing a reservation system and assigned priority within a frame, the traffic is allocated in certain information slots in an information sub-frame for transmission.

Controller node: Refers to a network participant that communicates with a plurality of uplinking nodes, and performs calculations to allocate network resources according to the network state information embedded in the reservation request.

Data application: This refers to any data stream provided at a node that creates data traffic; non-limiting examples include voice, data, and video signals.

Data packets: Refers to a discrete quantity of data, which is transmitted within a computer network.

Information subframe: This portion of the frame is the substance, or payload, of the transmission. The information subframe contains the substantive content of the information transmission, as opposed to, the reservation sub-frame.

Guard Bands: These are a portion of the slots that are utilized in order to keep the nodes in the network time-synchronized. The slot duration is assumed to be larger than packet duration by an interval equal to a guard band. These bands are essential to compensate for arbitrary delays incurred by transmitted packets due to signal propagation delays or clock drifts.

Priority: Generally defined as the creation of different levels of importance of servicing requests for resources (e.g., facilitating computer network traffic). This difference in degree of importance, or priority, can be based upon any number of factors, some examples of which (assuming the resource is computer network traffic) including type of traffic being transmitted, nodes with greater need to transmit information, and quantity of information being transmitted.

Reservations subframe: This is the portion of the frame in which each node transmits the priority of its data transmission and the buffer length. Where the information subframe allows for the transmission of the data which requested priority in the frame, the reservation subframe is the structure of the frame that transmits reservation requests.

Resource—"Resource" as used herein is intended to describe any limited commodity which must be allocated among a plurality of requesters having differing priorities. For example, in the preferred embodiment, the resource is bandwidth that must be allocated among a plurality of uplinking nodes to facilitate the transmission of different data types. In another embodiment, the resource could be a customer service resource such as a customer service staff that can be allocated using a computer system which takes into account varying priorities attached to different types of customer service requests.

Slots: Portion of a frame in which a particular reservation or a particular portion of data is transmitted from the uplinking node. These slots can be further subdivided into two types, information and reservation slots.

Uplinking node: Generally, these are the parts of the computer network that gather and transmit information. The uplinking nodes are the portions of the computer network that transmit reservation requests and data to the controller node.

Introduction

The present invention relates generally to computer networks and more specifically to maximizing computer network efficiency through effective allocation of network resources for data transmission. Generally, network communication does not assign any particular traffic a priority level, but operates on a demand basis allocating bandwidth among contending users. However, the present invention allows for priority to be assigned based on the type and the length of buffers storing the network traffic to be transmitted. In one example, a military field operation may have several different types of network traffic that needs to be transmitted including, voice, data and video. In addition, there may be a plurality of sources for each of these data types. One location, or node, may be airborne, and a plurality may be on the ground level. Additionally, each of the ground nodes may have a relative importance depending its location. For example, those around the perimeter of an area may be functioning as reconnaissance, while those near the center may be serving the purpose of backup, and priorities may be assigned based on the relative importance of each ground node.

The present invention is particularly useful in environments in which network communication resources are scarce, such as in wireless networking. In addition, the present invention may be applied more broadly to supply-demand systems such as those existing in service systems in which a limited amount of resources is being shared among several requesters. A non-limiting and illustrative example is the case of a banking system in which customers are queued in priority-based queues to wait for service. The queues may be grouped into uplinking nodes which communicate the priority the queues to a controller node. The controller node uses the priorities to allocate the banking resources in order to provide an optimum level of service. This type of embodiment is analogous to the embodiments designed strictly used for data transfer.

As stated, according to the present invention, each node can be assigned a differing level of priority in communication based on its relative importance when compared to other nodes. Additionally, in the case where data transfer is the system objective, each data type (voice, data, and video) can be assigned a differing level of priority. Thus, where there is a fixed volume of data that can be transmitted, the present invention can be utilized to assure a high quality of service (QoS) level based on the traffic type to be transmitted and any assignment of priority to a particular or class of nodes.

Specifics of the Present Invention

The present invention will be discussed primarily with respect to the preferred embodiment, which is designed for allocating wireless network communication resources among a plurality of uplinking nodes. Other embodiments for allocating other resources (services) will be discussed as appropriate. The hardware used in a general embodiment of the present invention is illustratively depicted in FIG. 1, showing a controller node 100 comprised of a processor 102, a memory 104 communicatively coupled with the processor 102, and a communication interface 106 communicatively coupled with the processor 102. The controller node 100 communicates with a plurality of uplinking nodes 108. The uplinking node 108 is comprised of a processor 110, a memory 112 communicatively coupled with the processor 110, and a communication interface 114 communicatively coupled with the processor 110. The communication between controller node 100 and the plurality of uplinking nodes 108 is performed to maximize the efficiency of data transmission. Although the embodiment shown in FIG. 1 is depicted as a wireless system for optimizing wireless bandwidth use, these restrictions need not apply to the system, and other resources (or combinations of resources) may be selected for allocation.

In the preferred embodiment, the controller node 100 and the uplinking nodes 108 are physically in a vertical relationship with the controller node 100 being a non-terrestrial vehicle in a controller tier servicing a plurality of uplinking nodes 108 in the form of terrestrial vehicles in a uplinking tier. Each one of the plurality of uplinking nodes 108 communicates with the communication interface 106 of the controller node 100 by transmitting and receiving data in a series of frames. Each frame includes a reservation subframe with a plurality of reservation slots as well as an information subframe including a plurality of information slots. The reservations are transmitted from the uplinking nodes 108 to the controller node 100 in a current frame K, and the resource allocations for the next frame K+1 are transmitted back to the uplinking nodes 108 so that the uplinking nodes 108 may transmit data per their allocations in the next frame K+1.

Each of the uplinking nodes 108 includes at least one data application operating within its memory and processor. The data application is operative for generating data having a particular priority (e.g., voice, text, or video data), and the processor 110 of the uplinking node 108 is operative for generating a reservation request based on the data generated by the data application. The reservation request is then transmitted from the communication interface 114 of the uplinking node 108 to the controller node 100 in the reservation subframe of the current frame K. The reservation subframe of the current frame K (described in more detail below relative to FIG. 5) includes the aggregate of the reservation requests from the plurality of uplinking nodes 108 in the uplinking tier serviced by the controller node 100. When the controller node 100 receives the reservation requests from the plurality of uplinking nodes 108, it uses the priority of each data application as well as information about the data generated by the data application to allocate the slots of the information subframe (described in more detail below relative to FIG. 5) of the next frame K+1. The controller node 100 does so by transmitting a control signal to each of the uplinking nodes 108 (preferably on a different channel than that of the data) indicating the slots of the information subframe of the next frame K+1 in which the respective uplinking node 108 is authorized to transmit.

Each one of the plurality of uplinking nodes 108 is operative to receive the control signal from the controller node 100, and to transmit data from the data application in the slots of the information subframe of the next frame K+1 in which the uplinking node 108 has been authorized to transmit.

The controller node 100 and the uplinking nodes 108 may be designed independently to work together in the manner described such that the system may be assembled from individual components and operated through the use of appropriate software. It is also conceivable that the present invention may be facilitated through the use of software "hard-coded" into a computer chip.

Figure 2:
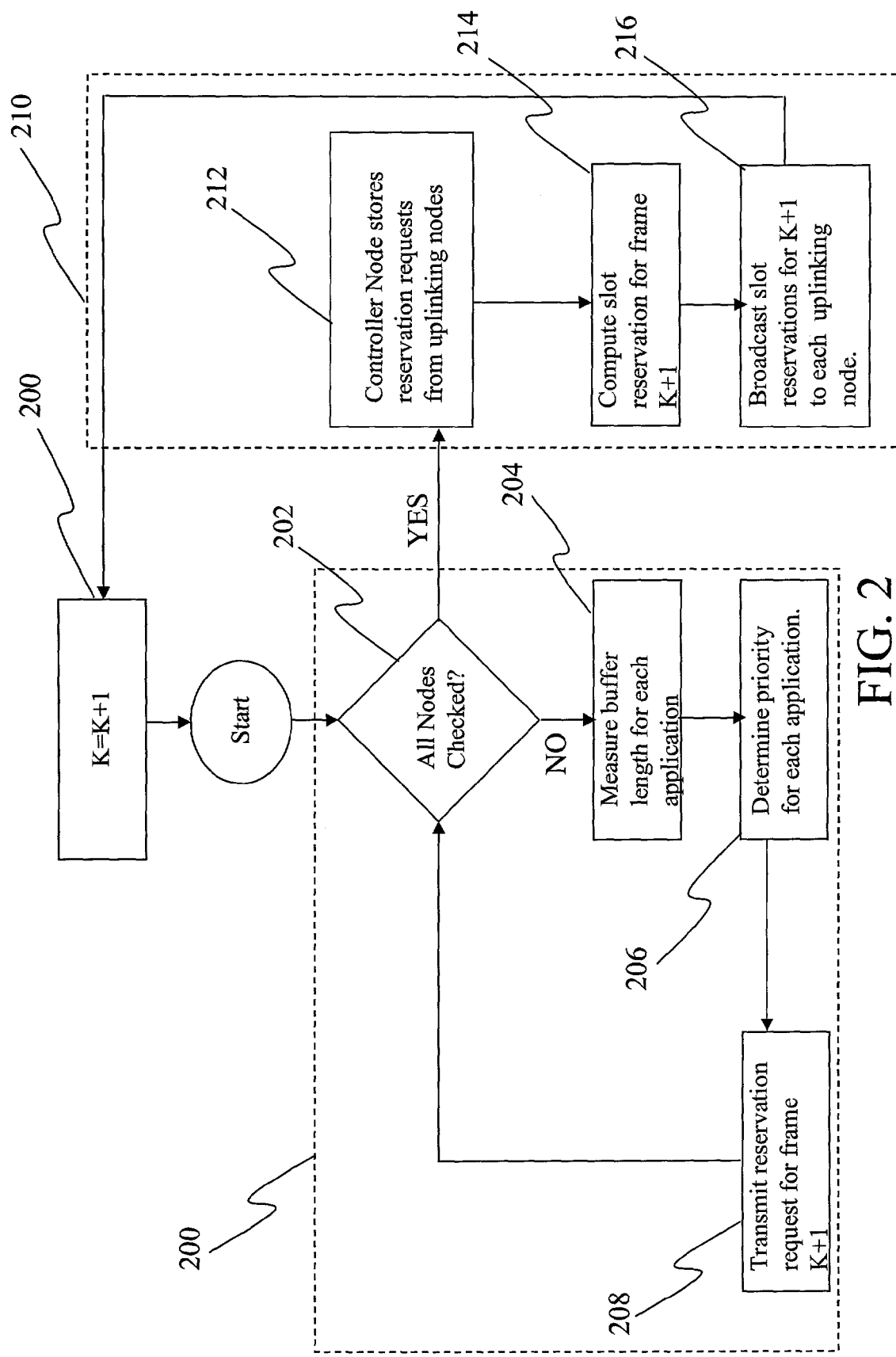
FIG. 2 is a flow diagram depicting the steps in communication between uplinking nodes and a controller node.
Figure 5:
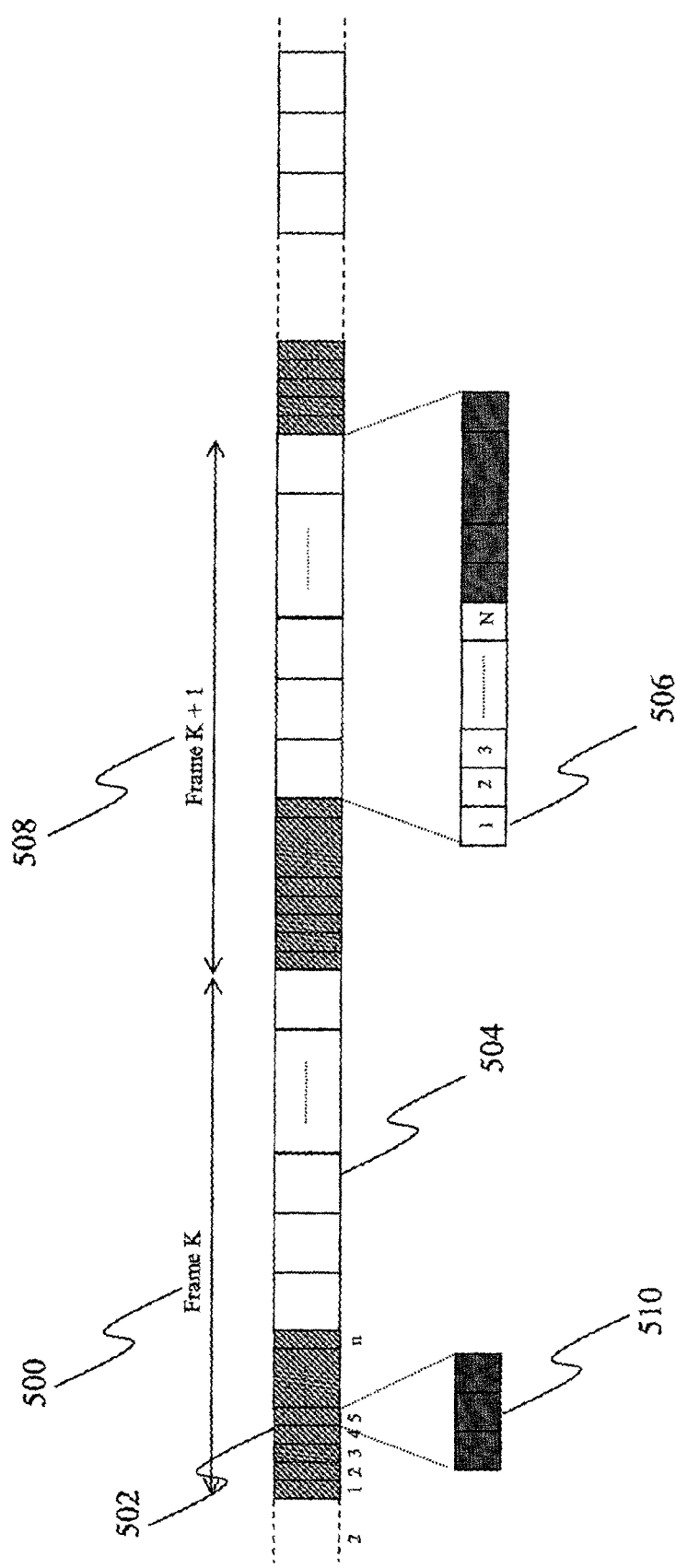
FIG. 5 is an illustration of a typical frame used in conjunction with the preferred embodiment of the present invention.

A flow diagram depicting the steps used the controller node and the uplinking nodes is provided in FIG. 2. Generally, the method optionally includes the steps of providing a controller tier having a controller node 100 and providing an uplinking tier having a plurality of uplinking nodes 108 (neither of these optional steps are shown in FIG. 5). Depending on the particular embodiment, it may be assumed that the method is simply for facilitating resource allocation between a pre-existing controller node 100 and a plurality of uplinking nodes 108. After the start 200 of the method, data is transmitted between the controller node and the uplinking nodes in a series of frames, with each frame transmitted including a reservation subframe and an information subframe. The reservation subframe has a plurality of reservation slots and the information subframe has a plurality of information slots. Note that with regard to the method, the current frame is denoted as K and the frame next in time (the next frame) is denoted as K+1. Further note that with regard to the method, the steps performed at the uplinking nodes are outlined by rectangle 202 and the steps performed by the controller node are outlined by rectangle 204 to assist the reader in more clearly understanding the workings of the invention.

Next, in an operating step, a data application is operated in the memory and processor of each uplinking node to generate data having a particular priority. The system checks to determine whether priority requests for all of the uplinking nodes 108 have been transmitted to the controller node 100 in a checking step 206. Note that the checking step 206 may be performed differently depending on the particular embodiment. For example, although depicted in FIG. 2 as being performed at the uplinking nodes 108, it may be performed at the controller node 100 or even outside the controller node 100 and the uplinking nodes 108. If not all of the nodes have been checked by the checking step 206, the controller node 100 continues to wait for all of the reservation requests to arrive from the uplinking nodes 108. As a practical matter, in a buffer measuring step 208, at each of the uplinking nodes 108, the data applications may be checked to determine the buffer length required for facilitating effective data transmission for the particular data application, and priority may be assigned on that basis. For example, in the case where the data application is a video application, it will likely have a greater buffer length than that required for the transmission of text or audio information. Consequently, the video application may be assigned a higher priority level than a text or audio application. Based on the results of the buffer measuring step 208, a priority is determined for each data application in a priority determining step 210. Note that the buffer measuring step 208 and the priority determining step 210 may be considered as a preferred way of accomplishing the assignment of a priority to data which is to be transferred. Priorities may be assigned to requesters for a resource to be allocated in any desired manner.

Next, the priorities determined in the priority determining step 210 are used to generate and transmit a reservation request for the next frame K+1 in a reservation request transmitting step 212. Preferably, the request is transmitted from the uplinking nodes 108 to the controller node 100 via the reservation subframe of the current frame K through the communication interface of the uplinking node 108 with the subframe of the current frame K including the aggregate of the reservation requests of the plurality of uplinking nodes 108. In this case, the end of the reservation subframe indicates the end of the checking step 206, signaling that all of the uplinking nodes 108 have been checked (e.g., have transmitted their reservation requests).

The controller node 100 receives the reservation requests from all of the uplinking nodes 108 in a reservation request receiving step 214. Preferably, this is accomplished by the controller node 100 receiving the reservation subframe including the reservation requests of the plurality of uplinking nodes 108 transmitted in frame K in order to reserve slots in frame K+1.

After receiving the reservation requests from all of the uplinking nodes 108, the controller node 100 computes and allocates slot reservations for the information subframe for the next frame K+1 in a reservation computing step 216. Next, the controller node 100 transmits a control signal to each of the of the uplinking nodes 108 in a control signal transmitting step 218, indicating the slots of the information subframe of the next frame K+1 in which the uplinking node 108 is authorized to transmit. Preferably, in a wireless communication embodiment, the control signal is transmitted on a channel separate from that of the data channel in order to minimize interference and to maximize the efficient use of the data channel.

The control signal from the controller node 100 is received at each of the uplinking nodes 108 and is used to signal to each of the uplinking nodes 108 to transmit data from the data applications in the slots of the next frame K+1 in which the respective uplinking node 108 is authorized to transmit. In FIG. 2, the K=K+1 box 220 indicates a shift from the current frame K to the next frame in time K+1.

Figure 3:
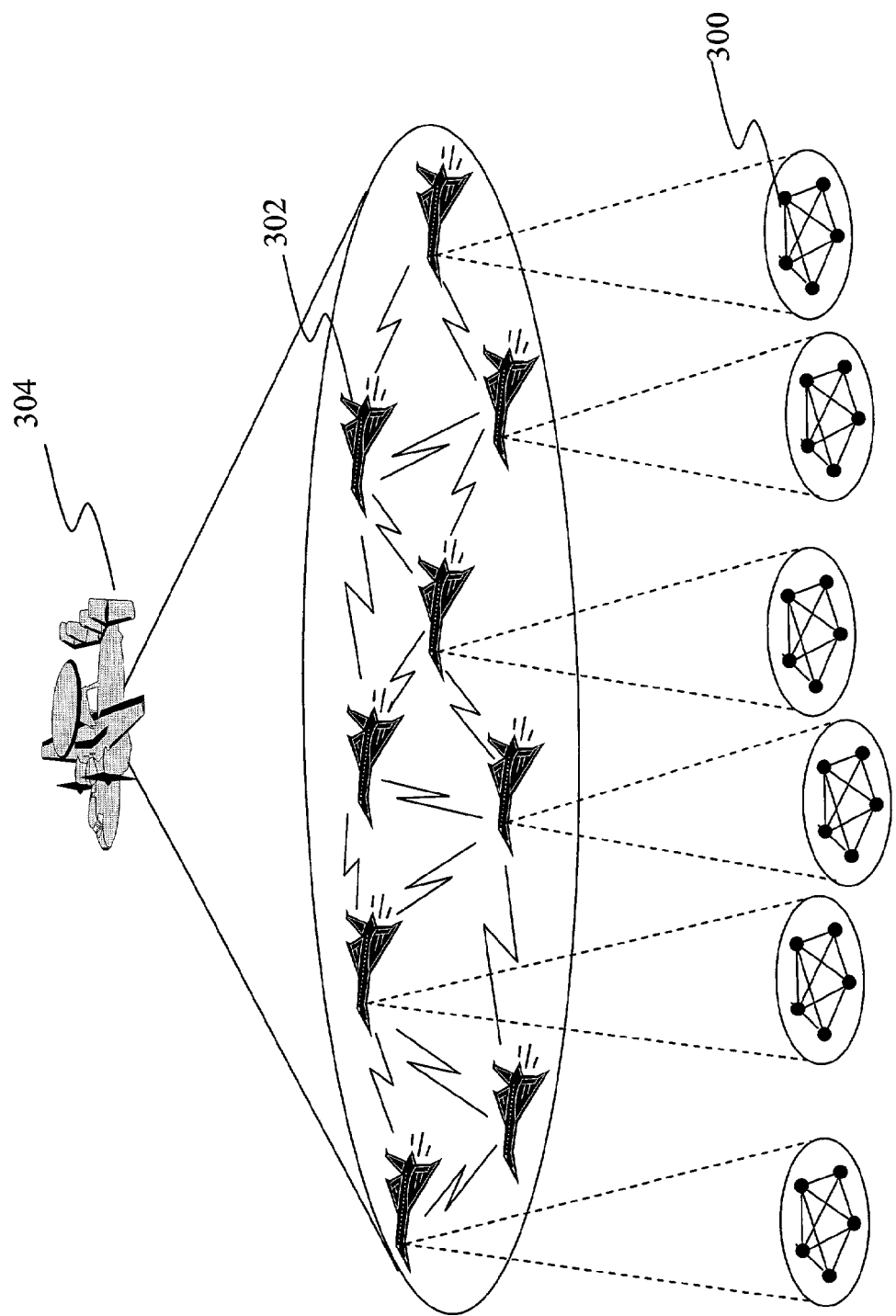
FIG. 3 is an illustration depicting communication between pluralities of nodes belonging to different tiers in a three-tier system.

An illustration of a multi-tiered embodiment of the present invention is depicted in FIG. 3, wherein a terrestrial tier of plurality of uplinking nodes 300 communicates with a first airborne tier of a plurality of controllers nodes 302. In addition, the plurality of controller nodes communicates with second airborne tier of controller nodes 304. Airborne-supported ad hoc networks may be utilized in military applications. Rapid deployment of a multi-tiered network providing end-to-end quality of service and efficient system performance is desirable.

Preferably, the uplinking nodes 300 are terrestrial vehicles and the controller nodes 302 and 304 are non-terrestrial vehicles. However, none of the nodes need be vehicles, per se. Non-limiting examples of terrestrial vehicles include automobiles and boats, and non-limiting examples of non-terrestrial vehicles include airplanes and balloons. Nodes could also be submerged and could be non-vehicular in form, such as individual persons on foot.

The embodiment shown in FIG. 3 provides a graphical representation for demonstrating how the present invention may be expanded into a tree-like structure wherein the controller nodes 302 on a lower level can optionally serve as uplinking nodes to a controller node 304 on a higher level. Depending on the point of view, the uplinking nodes 300 may also serve as controller nodes for a lower level of uplinking nodes. In essence, the two-tier general description above may be applied modularly in the case of an even number of tiers, or in part in the case of an odd number of tiers, to form a multi-level tree-type structure for uplinking and for resource allocation. This multi-tiered concept may be readily applied for the automated priority-based allocation of any resource. In this case, controller nodes are simply designed as mechanisms for allocating limited service resources to customers based on customer requests at a plurality of uplinking nodes where the customer requests have priorities.

Figure 4:
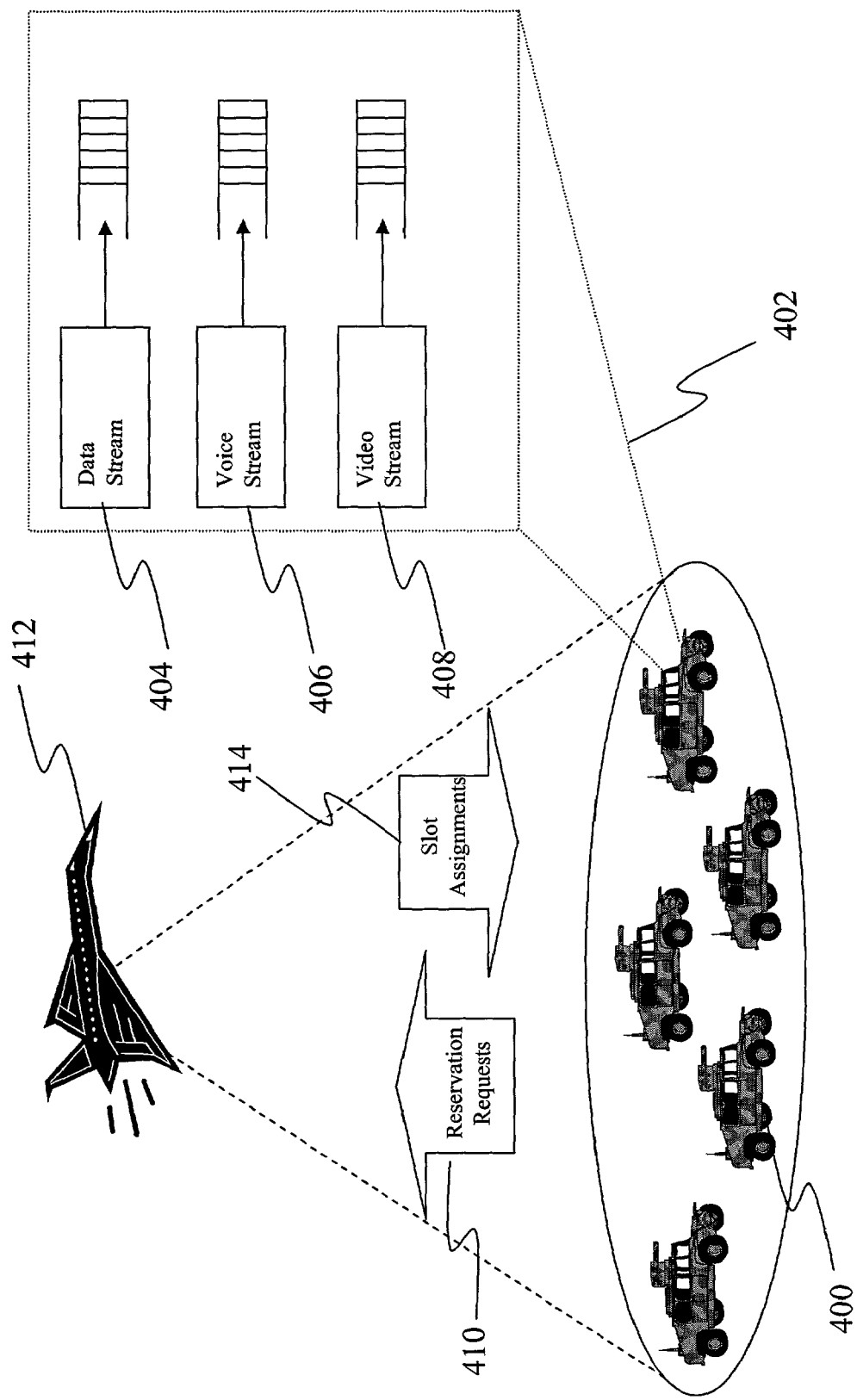
FIG. 4 is an illustration depicting network traffic between a controller node and a plurality of uplinking nodes with the controller node depicted as an airplane and the uplinking nodes depicted as terrestrial vehicles.

An illustrative diagram to further demonstrate the allocation of network communication resources between controller and uplinking nodes is provided in FIG. 4. A terrestrial tier is depicted as a plurality of terrestrial vehicles representing a plurality of uplinking nodes 400, where each of the uplinking nodes has application data 402 from a variety of sources and with a variety of priorities. As depicted, non-limiting examples of traffic types include data 404, voice 406, and video 408 streams. Reservation requests 410 are transmitted from the uplinking nodes 400 to the controller nodes at the airborne tier 412. These reservation requests 410 are processed by the controller node 412 in the K reservation frame, and slot assignments 414 are transmitted from the controller node 412 to the plurality of uplinking nodes 400.

An illustration of an embodiment of a typical frame used in conjunction with the preferred embodiment of the present invention is depicted in FIG. 5. The frame 500 includes a reservation subframe 502 and an information subframe 504. The reservation subframe 502 is the portion of the frame K 500 in which the uplinking nodes transmit reservation information, whereby space is reserved in the information slots 506 in the next frame K+1 508. The reservation subframe 502 is further comprised of a plurality of reservation mini-slots 510 utilized for different traffic streams. These different traffic streams may include, but are not limited to, data, voice and video traffic streams. Each of these differing traffic streams may have intrinsic levels of priority or their priority may be dependent on the node from which each originates.

The information subframe 504 generally comprises two information slot types used for differing types of traffic. One type of information slot that may be utilized is a contention-based information slot. Contention-based information slots allow competing application traffic to vie for space within a portion of the information subframe. The first application that transmits information to the controller node via a contention-based information slot will be allocated use of the slot (i.e., contention-based information slots are allocated on a first-come, first-served basis). Contention-based slots are most effectively used for traffic that is not particularly sensitive to packet delays such as the transmission of text files. Video or audio files, on the other hand, are very sensitive to delays and are not good candidates for transmission using contention-based slots.

The other type of information slot that is used is the contention-free information slot. The contention-free information slot is the type of primary concern with respect to the resource allocation scheme of the present invention. The contention free information slots are allocated using a technique that optimally allocates the 'N' contention-free slots to a plurality of traffic streams depending on the network state and the priorities of the application data or uplinking node priority. Each data application has a predicted buffer length, which is computed for each application, and transmits data in packets, and wherein the contention-free slots of the information subframe are allocated by the controller node according to:

$$B_{ij}^{min}(K) = \sum_i \sum_j [L_{ij}(K+1) - B_{ij}(K)] P_{ij}, \quad (1)$$

such that $$\sum_i \sum_j B_{ij}(K) = N, \text{ where} \quad (2)$$

$B_{ij}(K)$=number of slots per information subframe allocated to data application j from node i in frame K;
$P_{ij}$=priority of data application j from node i;
N=number of slots per information subframe; and
$L_{ij}(K+1)$=a predicted buffer length of data application j from node i in frame K+1, and is given by the following relationship, $$L_{ij}(K+1) = L_{ij}(K) - B_{ij}(K-1) + A_{ij}(K),$$

where
$A_{ij}(K)$=an estimation of the number of packet arrivals from data application j in node i in frame K.

Additionally, the slot allocation is given by the following equation:

$$B_{ij}(K) = \frac{L_{ij}(K+1)}{\left(1 + \frac{\mu}{P_{ij}}\right)} \quad (3)$$

where:
$B_{ij}(K)$=number of slots allocated to traffic stream j from node i in frame K;
$P_{ij}$=priority level of traffic stream j from node i;
N=number of contention-free slots per frame; and
$L_{ij}(K+1)$=predicted buffer length of traffic stream j from node i in frame K+1.

Equation (3) represents a closed-form solution to the equation (1) where μ is a constant determined from the constraint provided by equation (2).

This technique for slot allocation may be applied more generally to other resources where the an incidence of a scarce resource (e.g., a customer service event) where the requests are queued through the use of a buffer and where each buffer of requests is given a particular priority.

Further, the technique of slot (resource) allocation just described may be applied as a further refinement of the reservation computing step 216 of the method of the present invention, as depicted in FIG. 2.

Figure 6:
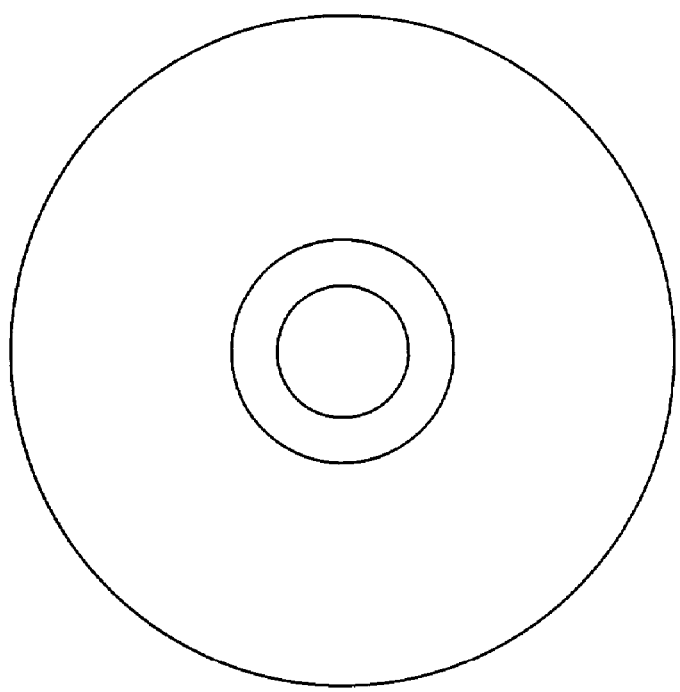
FIG. 6 is an illustration of a computer program product embodiment for facilitating the method of the present invention.

A computer program product embodying the method of the present invention is depicted in FIG. 6. The computer program product may take the form of any computer-readable media such as an optical medium (e.g., a compact disk or a digital versatile disk (DVD)), a magnetic medium (e.g., a floppy disk or tape), or a memory such as a flash-memory. In this case, the hardware used in conjunction with the computer program product would have to incorporate an input/output device compatible with the computer program product. The computer program embedded in the computer program product may be created through the use of any appropriate programming language and may be in the form of source code or object code.

What is claimed is:

1. A computer network uplinking system comprising:
   a. a controller tier including a controller node having a processor, a memory communicatively coupled with the processor, and a communication interface communicatively coupled with the processor;
   b. an uplinking tier including a plurality uplinking nodes, with each one of the plurality of uplinking nodes having a processor, a memory communicatively coupled with the processor, and a communication interface communicatively coupled with the processor, wherein the communication interface of each one of the plurality of uplinking nodes communicates with the communication interface of the controller node by transmitting and receiving data in a series of frames, with each frame including a reservation subframe, including a plurality of reservation slots, and an information subframe, including a plurality of slots, and with a current frame represented as frame K and a next frame represented as a frame K+1;
   c. wherein each uplinking node further includes at least one data application operating within its memory and processor, with the data application operative to generate data having a particular priority, and wherein the processor generates a reservation request based on the data generated by the data application and transmits the request to the controller node via the reservation subframe of the current frame K through the communication interface, with the reservation subframe of the frame K including the aggregate of the reservation requests of the plurality of uplinking nodes;
   d. wherein the controller node is operative to receive the reservation subframe including the reservation requests of the plurality of uplinking nodes in the frame K, and wherein the controller node utilizes the priority of each data application as well as information about the data generated by the data application in order to allocate the slots of the information subframe of the next frame K+1, and wherein the controller node sends a control signal to each of the uplinking nodes indicating the slots of the information subframe of the next frame K+1 in which the respective uplinking node is authorized to transmit; and e. wherein each one of the plurality of uplinking nodes is operative to receive the control signal from the controller node, and to transmit data from the data application in the slots of the information subframe of the next frame K+1 in which the uplinking node is authorized to transmit.

2. A computer network uplinking system as set forth in claim 1, wherein the uplinking nodes communicate with the controller node by means of a wireless channel.

3. A computer network uplinking system as set forth in claim 2, wherein the uplinking nodes are terrestrial vehicles and wherein the controller node is a non-terrestrial vehicle.

4. A computer network uplinking system as set forth in claim 2, wherein both the uplinking nodes and the controller node are non-terrestrial vehicles.

5. A computer network uplinking system as set forth in claim 1, wherein the controller node is a mechanism for allocating limited service resources to customers and where the uplinking nodes are means for requesting service resource allocations from the controller node based on customer requests where the customer requests have priorities.

6. A computer network uplinking system as set forth in claim 5, wherein the uplinking nodes communicate with the controller node by means of a wireless channel.

7. A computer network uplinking system as set forth in claim 1, wherein the controller node optionally serves as an uplinking node to higher-level controller node and wherein the uplinking nodes optionally serve as controller nodes for lower-level uplinking nodes, whereby a multi-tier computer uplinking system is formed as a tree-type structure.

8. A computer network uplinking system as set forth in claim 7, wherein the uplinking nodes communicate with the controller node by means of a wireless channel.

9. A computer network uplinking system as set forth in claim 1, wherein each data application transmits data in packets, and wherein the slots of the information subframe are allocated by the controller node via solving the following optimization problem:

$$B_{ij}^{min}(K) = \sum_i \sum_j [L_{ij}(K+1) - B_{ij}(K)]P_{ij},$$

such that $$\sum_i \sum_j B_{ij}(K) = N,$$

where
$B_{ij}(K)$=number of slots per information subframe allocated to data application j from node i in frame K;
$P_{ij}$=priority of data application j from node i;
N=number of slots per information subframe; and
$L_{ij}(K+1)$=a predicted buffer length of data application j from node i in frame K+1, and is given by the following relationship, $$L^{ij}(K+1)=L_{ij}(K)-B_{ij}(K-1)+A_{ij}(K),$$

where
$A_{ij}(K)$=an estimation of the number of packet arrivals from data application j in node i in frame K.

10. A computer network uplinking system as set forth in claim 9, wherein the solution to the optimization problem is given by the following equation:

$$B_{ij}(K) = \frac{L_{ij}(K+1)}{\left(1 + \frac{\mu}{P_{ij}}\right)},$$

where $\mu$ is a constant determined from the constraint $$\sum_i \sum_j B \sum_{ij}(K) = N.$$

11. A computer network uplinking system as set forth in claim 10, wherein the uplinking nodes communicate with the controller node by means of a wireless channel.

12. A computer network uplinking system as set forth in claim 11, wherein the uplinking nodes are terrestrial vehicles and wherein the controller node is a non-terrestrial vehicle.

13. A computer network uplinking system as set forth in claim 10, wherein the controller node optionally serves as an uplinking node to higher-level controller node and wherein the uplinking nodes optionally serve as controller nodes for lower-level uplinking nodes, whereby a multi-tier computer uplinking system is formed as a tree-type structure.

14. A computer network uplinking system as set forth in claim 13, wherein the uplinking nodes communicate with the controller node by means of a wireless channel.

15. A computer network uplinking system as set forth in claim 14, wherein each of the uplinking nodes is selected from the group consisting of terrestrial vehicles and non-terrestrial vehicles, and wherein each of the controller nodes is selected from the group consisting of terrestrial vehicles and non-terrestrial vehicles.

16. A controller node for use in a network uplinking system, the controller node comprising:

a. a processor, a memory communicatively coupled with the processor, and a communication interface communicatively coupled with the processor, with the communication interface operative for communicating with each one of a plurality of uplinking nodes by transmitting and receiving data in a series of frames, with each frame including a reservation subframe including a plurality of reservation slots, and an information subframe including a plurality of slots, and with a current frame represented as frame K and a next frame represented as a frame K+1;

b. wherein the controller node is operative to receive the reservation subframe including reservation requests of the plurality of uplinking nodes in the frame K, and wherein the controller node utilizes a data application priority as well as information about the data generated by a data application to allocate the slots of the information subframe of the next frame K+1, and wherein the controller node sends a control signal to each of the uplinking nodes indicating the slots of the information subframe of the next frame K+1 in which the respective up linking node is authorized to transmit.

17. A controller node for use in a network uplinking system as set forth in claim 16, wherein the controller node is configured to communicate with uplinking nodes by means of a wireless channel.

18. A controller node for use in a network uplinking system as set forth in claim 17, wherein the controller node is a non-terrestrial vehicle.

19. A controller node for use in a network uplinking system as set forth in claim 16, wherein the controller node is a mechanism for allocating limited service resources to customers based on customer requests at a plurality of uplinking nodes where the customer requests have priorities.

20. A controller node for use in a network uplinking system as set forth in claim 19, wherein the uplinking nodes communicate with the controller node by means of a wireless channel.

21. A controller node for use in a network uplinking system as set forth in claim 16, wherein the controller node optionally serves as an uplinking node to higher-level controller node whereby a multi-tier computer up linking system is formed as a tree-type structure.

22. A controller node for use in a network uplinking system as set forth in claim 21, wherein the uplinking nodes communicate with the controller node by means of a wireless channel.

23. A controller node for use in a network uplinking system as set forth in claim 16, wherein each data application transmits data in packets, and wherein the slots of the information subframe are allocated by the controller node via solving the following optimization problem:

$$B_{ij}^{min}(K) = \sum_i \sum_j [L_{ij}(K+1) - B_{ij}(K)]P_{ij},$$

such that $$\sum_i \sum_j B_{ij}(K) = N,$$

where $B_{ij}(K)$=number of slots per information subframe allocated to data application j from node i in frame K;
$P_{ij}$=priority of data application j from node i;
N=number of slots per information subframe; and
$L_{ij}(K+1)$=a predicted buffer length of data application j from node i in frame K+1, and is given by the following relationship, $L_{ij}(K+1) = L_{ij}(K) - B_{ij}(K-1) + A_{ij}(K)$, where $A_{ij}(K)$=an estimation of the number of packet arrivals from data application j in node i in frame K.

24. A controller node for use in a network uplinking system as set forth in claim 23, where in the solution to the optimization problem is given by the following equation:

$$B_{ij}(K) = \frac{L_{ij}(K+1)}{\left(1 + \frac{\mu}{P_{ij}}\right)},$$

where μ is a constant determined from the constraint $$\sum_i \sum_j B_{ij}(K) = N.$$

25. A controller node for use in a network uplinking system as set forth in claim 24, wherein the uplinking nodes communicate with the controller node by means of a wireless channel.

26. A controller node for use in a network uplinking system as set forth in claim 25, wherein the controller node is a non-terrestrial vehicle.

27. A controller node for use in a network uplinking system as set forth in claim 24, wherein the controller node optionally serves as an uplinking node to higher-level controller node whereby a multi-tier computer uplinking system is formed as a tree-type structure.

28. A controller node for use in a network uplinking system as set forth in claim 27, wherein the uplinking nodes communicate with the controller node by means of a wireless channel.

29. A controller node for use in a network uplinking system as set forth in claim 28, wherein each of the controller nodes is selected from the group consisting of terrestrial vehicles and non-terrestrial vehicles.

30. An uplinking node for use in a computer network uplinking system, the uplinking node comprising:
 a. a processor, a memory communicatively coupled with the processor, and a communication interface communicatively coupled with the processor, wherein the communication interface of each one of the plurality of uplinking nodes communicates with the communication interface of a controller node by transmitting and receiving data in a series of frames, with each frame including a reservation subframe, including a plurality of reservation slots, and an information subframe, including a plurality of slots, and with a current frame represented as frame K and a next frame represented as a frame K+1;
 b. wherein the uplinking node further includes at least one data 15 application operating within its memory and processor, with the data application operative to generate data having a particular priority, and wherein the processor generates a reservation request based on the data generated by the data application and transmits the request to the controller node via the reservation subframe of the current frame K through the communicationinterface, with the reservation subframe of the frame K including the aggregate of the reservation requests of the plurality of uplinking nodes; and
 c. wherein each one of the plurality of uplinking nodes is operative to receive the control signal from the controller node generated based on the reservation request from the uplinking node, and to transmit data from the data application in the slots of the information subframe of the next frame K+1 in which the uplinking node is authorized to transmit.

31. An uplinking node for use in a computer network uplinking system as set forth in claim 30, wherein the uplinking nodes are configured to communicate with the controller node by means of a wireless channel.

32. An uplinking node for use in a computer network uplinking system as set forth in claim 31, wherein the uplinking nodes are selected from the group consisting of terrestrial vehicles and non-terrestrial vehicles.

33. An uplinking node for use in a computer network uplinking system as set forth in claim 30, wherein the uplinking nodes are means for requesting service resource allocations from a controller node based on customer requests where the customer requests have priorities.

34. An uplinking node for use in a computer network uplinking system as set forth in claim 33, wherein the uplinking node is configured to communicate with a controller node by means of a wireless channel.

35. An uplinking node for use in a computer network uplinking system as set forth in claim 30, wherein the uplinking nodes optionally serve as controller nodes for lower-level uplinking nodes, whereby a multi-tier computer uplinking system is formed as a tree-type structure.

36. An uplinking node for use in a computer network uplinking system as set forth in claim 35, wherein the uplinking node is configured to communicate with a controller node by means of a wireless channel.

37. A method for facilitating computer network uplinking comprising the steps of:
  a. providing a controller tier including a controller node having a processor, a memory communicatively coupled with the processor, and a communication interface communicatively coupled with the processor;
  b. providing an uplinking tier including a plurality uplinking nodes, with each one of the plurality of uplinking nodes having a processor, a memory communicatively coupled with the processor, and a communication interface communicatively coupled with the processor;
  c. transmitting data between the controller node and the uplinking nodes in a series of frames, with each frame including a reservation subframe including a plurality of reservation slots, and an information subframe including a plurality of slots, and with a current frame represented as frame K and a next frame represented as a frame K+1;
  d. operating a data application in the memory and processor of each uplinking node to generate data having a particular priority;
  e. generating a reservation request in the processor of each uplinking node on the data generated by the data application;
  f. transmitting the request from the uplinking node to the controller node via the 10 reservation subframe of the current frame K through the communication interface of the uplinking node, with the reservation subframe of the frame K including the aggregate of the reservation requests of the plurality of uplinking nodes;
  g. receiving, at the controller node, the reservation subframe including the reservation requests of the plurality of uplinking nodes in the frame K;
  h. allocating slots of the information subframe of the next frame K+1 based on the priority of each data application as well as information about the data generated by the data application;
  i. transmitting a control signal to each of the uplinking nodes from the controller node indicating the slots of the information subframe of the next frame K+1 in which the respective up linking node is authorized to transmit; and
  j. receiving the control signal from the controller node, at each one of the plurality of uplinking nodes; and
  k. transmitting data from the data application in the slots of the information subframe of the next frame K+1 in which the uplinking node is authorized to transmit.

38. A method for facilitating computer network uplinking as set forth in claim 37, wherein the transmitting and receiving steps are all performed by means of a wireless channel.

39. A method for facilitating computer network uplinking as set forth in claim 37, wherein the controller node is provided as a means for allocating limited service resources to customers and where the uplinking nodes are provided as a means for requesting service resource allocations from the controller node based on customer requests where the customer requests have priorities.

40. A method for facilitating computer network uplinking as set forth in claim 39, wherein the transmitting and receiving steps are all performed by means of a wireless channel.

41. A method for facilitating computer network uplinking as set forth in claim 37, wherein the controller node is provided to optionally serve as an uplinking node to higher-level controller node and wherein the uplinking nodes is provided to optionally serve as controller nodes for lower-level uplinking nodes, whereby a multi-tier computer uplinking system is formed as a tree-type structure.

42. A method for facilitating computer network uplinking as set forth in claim 41, wherein the transmitting and receiving steps are all performed by means of a wireless channel.

43. A method for facilitating computer network uplinking as set forth in claim 37, wherein in the transmitting step, each data application transmits data in packets, and wherein in the allocating step, the slots of the information subframe are allocated by the controller node via solving the following optimization problem:

$$B_{ij}^{\min}(K) = \sum_i \sum_j [L_{ij}(K+1) - B_{ij}(K)]P_{ij},$$

such that $$\sum_i \sum_j B_{ij}(K) = N,$$

where
  $B_{ij}(K)$=number of slots per information subframe allocated to data application j from node i in frame K;
  $P_{ij}$=priority of data application j from node i;
  N=number of slots per information subframe; and
  $L_{ij}(K+1)$=a predicted buffer length of data application j from node i in frame K+1, and is given by the following relationship, $L_{ij}(K+1)=L_{ij}(K)-B_{ij}(K-1)+A_{ij}(K)$, where $A_{ij}(K)$=an estimation of the number of packet arrivals from data application j in node i in frame K.

44. A method for facilitating computer network uplinking as set forth in claim 38, wherein for the allocating step, the solution to the optimization problem is given by the following equation:

$$B_{ij}(K) = \frac{L_{ij}(K+1)}{\left(1 + \frac{\mu}{P_{ij}}\right)},$$

where $\mu$ is a constant determined from the constraint $$\sum_i \sum_j B_{ij}(K) = N.$$

45. A method for facilitating computer network uplinking as set forth in claim 44, wherein the transmitting and receiving steps are all performed by means of a wireless channel.

46. A method for facilitating computer network uplinking as set forth in claim 44, wherein the controller node is provided to optionally serve as an uplinking node to higher-level controller node and wherein the uplinking nodes is provided to optionally serve as controller nodes for lower-level uplinking nodes, whereby a multi-tier computer uplinking system is formed as a tree-type structure.

47. A method for facilitating computer network uplinking as set forth in claim 46, wherein the transmitting and receiving steps are all performed by means of a wireless channel.

48. A method for facilitating computer network uplinking in a computer network comprising a controller tier including a controller node having a processor, a memory communicatively coupled with the processor, and a communication interface communicatively coupled with the processor and an uplinking tier including a plurality uplinking nodes, with each one of the plurality of uplinking nodes having a processor, a memory communicatively coupled with the processor, and a communication interface, communicatively coupled with the processor, the method comprising the steps of:
   a. transmitting data between the controller node and the uplinking nodes in a series of frames, with each frame including a reservation subframe including a plurality of reservation slots, and an information subframe including a plurality of slots, and with a current frame represented as frame K and a next frame represented as a frame K+1;
   b. operating a data application in the memory and processor of each uplinking node to generate data having a particular priority;
   c. generating a reservation request in the processor of each uplinking node on the data generated by the data application;
   d. transmitting the request from the uplinking node to the controller node via the reservation subframe of the current frame K through the communication interface of the uplinking node, with the reservation subframe of the frame K including the aggregate of the reservation requests of the plurality of up linking nodes;
   e. receiving, at the controller node, the reservation subframe including the reservation requests of the plurality of uplinking nodes in the frame K;
   f. allocating slots of the information subframe of the next frame K+1 based on the priority of each data application as well as information about the data generated by the data application;
   g. transmitting a control signal to each of the uplinking nodes from the controller node indicating the slots of the information subframe of the next frame K+1 in which the respective uplinking node is authorized to transmit; and
   h. receiving the control signal from the controller node, at each one of the plurality of uplinking nodes; and
   i. transmitting data from the data application in the slots of the information subframe of the next frame K+1 in which the uplinking node is authorized to transmit.

49. A method for facilitating computer network uplinking as set forth in claim 48, wherein the transmitting and receiving steps are all performed by means of a wireless channel.

50. A method for facilitating computer network uplinking as set forth in claim 48, wherein in the transmitting step, each data application transmits data in packets, and wherein in the allocating step, the slots of the information subframe are allocated by the controller node via solving the following optimization problem:

$$B_{ij}^{\min}(K) = \sum_i \sum_j [L_{ij}(K+1) - B_{ij}(K)] P_{ij},$$

such that $$\sum_i \sum_j B_{ij}(K) = N,$$

where
   $B_{ij}(K)$=number of slots per information subframe allocated to data application j from node i in frame K;
   $P_{ij}$=priority of data application j from node i;
   N=number of slots per information subframe; and
   $L_{ij}(K+1)$=a predicted buffer length of data application j from node i in frame K+1, and is given by the following relationship, $L_{ij}(K+1)=L_{ij}(K)-B_{ij}(K-1)+A_{ij}(K)$, where $A_{ij}(K)$=an estimation of the number of packet arrivals from data application j in node i in frame K.

51. A method for facilitating computer network uplinking as set forth in claim 48, wherein for the allocating step, the solution to the optimization problem is given by the equation:

$$B_{ij}(K) = \frac{L_{ij}(K+1)}{\left(1 + \frac{\mu}{P_{ij}}\right)},$$

where $\mu$ is a constant determined from the constraint $$\sum_i \sum_j B_{ij}(K) = N.$$

52. A method for facilitating computer network uplinking as set forth in claim 51, wherein the transmitting and receiving steps are all performed by means of a wireless channel.

53. A computer program product for facilitating uplinking in a computer network comprising a controller tier including a controller node having a processor, a memory communicatively coupled with the processor, and a communication interface communicatively coupled with the processor and an uplinking tier including a plurality uplinking nodes, with each one of the plurality of uplinking nodes having a processor, a memory communicatively coupled with the processor, and a communication interface, communicatively coupled with the processor, the computer program product operative for facilitating steps of:

a. transmitting data between the controller node and the uplinking nodes in a series of frames, with each frame including a reservation subframe including a plurality of reservation slots, and an information subframe including a plurality of slots, and with a current frame represented as frame K and a next frame represented as a frame K+1;
  b. operating a data application in the memory and processor of each uplinking node to generate data having a particular priority;
  c. generating a reservation request in the processor of each uplinking node on the data generated by the data application;
  d. transmitting the request from the uplinking node to the controller node via the reservation subframe of the current frame K through the communication interface of the uplinking node, with the reservation subframe of the frame K including the aggregate of the reservation requests of the plurality of uplinking nodes;
  e. receiving, at the controller node, the reservation subframe including the reservation requests of the plurality of uplinking nodes in the frame K;
  f. allocating slots of the information subframe of the next frame K+1 based on the priority of each data application as well as information about the data generated by the data application;
  g. transmitting a control signal to each of the uplinking nodes from the controller node indicating the slots of the information subframe of the next frame K+1 in which the respective uplinking node is authorized to transmit;
  h. receiving the control signal from the controller node, at each one of the plurality of uplinking nodes; and
  i. transmitting data from the data application in the slots of the information subframe of the next frame K+1 in which the uplinking node is authorized to transmit.

54. A computer program product for facilitating uplinking as set forth in claim 53, wherein the transmitting and receiving steps are all performed by means of a wireless channel.

55. A computer program product for facilitating uplinking as set forth in claim 53, wherein in the transmitting step, each data application transmits data in packets, and wherein in the allocating step, the slots of the information sub frame are allocated by the controller node via solving the following optimization problem:

$$B_{ij}^{min}(K) = \sum_i \sum_j [L_{ij}(K+1) - B_{ij}(K)]P_{ij},$$

such that $$\sum_i \sum_j B_{ij}(K) = N,$$

where
  $B_{ij}(K)$=number of slots per information subframe allocated to data application j from node i in frame K;
  $P_{ij}$=priority of data application j from node i;
  N=number of slots per information subframe; and
  $L_{ij}(K+1)$=a predicted buffer length of data application j from node i in frame K+1, and is given by the following relationship, $L_{ij}(K+1)=L_{ij}(K)-B_{ij}(K-1)+A_{ij}(K)$ where, $A_{ij}(K)$=an estimation of the number of packet arrivals from data application j in node i in frame K.

56. A computer program product for facilitating uplinking as set forth in claim 53, wherein for the allocating step, the solution to the optimization problem is given by the following equation:

$$B_{ij}(K) = \frac{L_{ij}(K+1)}{\left(1+\dfrac{\mu}{P_{ij}}\right)},$$

where μ is a constant determined from the constraint $$\sum_i \sum_j B_{ij}(K) = N.$$

57. A computer program product for facilitating uplinking as set forth in claim 56, wherein the transmitting and receiving steps are all performed by means of a wireless channel.

* * * * *

UNITED STATES PATENT AND TRADEMARK OFFICE
CERTIFICATE OF CORRECTION

| | |
|---|---|
| PATENT NO. | : 7,054,936 B2 |
| APPLICATION NO. | : 10/097543 |
| DATED | : May 30, 2006 |
| INVENTOR(S) | : Tamer El Batt et al. |

It is certified that error appears in the above-identified patent and that said Letters Patent is hereby corrected as shown below:

Col. 17, Line 66 in the equation at the bottom of column 17, the superscript on the first variable should be a subscript. The equation:

"$L^{ij}(K+1)=L_{ij}(K)-B_{ij}(K-1)+A_{ij}(K)$"
should read
--$L_{ij}(K+1)=L_{ij}(K)-B_{ij}(K-1)+A_{ij}(K)$--

Signed and Sealed this

Sixth Day of May, 2008

JON W. DUDAS
*Director of the United States Patent and Trademark Office*